(12) United States Patent
Saffouri (10) Patent No.: US 10,500,648 B1
(45) Date of Patent: Dec. 10, 2019

(54) TOOL HOLDER HAVING INTEGRALLY FORMED ANTI-VIBRATION COMPONENT AND CUTTING TOOL PROVIDED WITH TOOL HOLDER

(71) Applicant: Iscar, Ltd., Tefen (IL)

(72) Inventor: Jony Saffouri, Natereth Eilit (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 16/006,306

(22) Filed: Jun. 12, 2018

(51) Int. Cl.
| | |
|---|---|
| *B23B 29/00* | (2006.01) |
| *B23B 29/02* | (2006.01) |
| *B23B 47/00* | (2006.01) |
| *B23B 29/12* | (2006.01) |
| *B23B 27/00* | (2006.01) |

(52) U.S. Cl.
CPC .......... *B23B 29/125* (2013.01); *B23B 27/002* (2013.01); *B23B 2250/16* (2013.01)

(58) Field of Classification Search
CPC ............ B23B 2215/72; B23B 2270/30; B23B 2250/16; B23B 27/002; B23B 29/022; B23B 29/125; B23B 2229/00; B23Q 11/0035; B23Q 11/0039; B23C 5/003
See application file for complete search history.

(56) References Cited

U.S. PATENT DOCUMENTS 2,606,366 A * 8/1952 Stevens .................... A61C 3/02
   188/268
2,641,940 A * 6/1953 White ................... B23B 29/022
   188/268

(Continued)

FOREIGN PATENT DOCUMENTS

DE   202013008019 U1 * 9/2013 ............. B23B 31/02
EP      1693131 A1 * 8/2006 ........... B23B 27/002
(Continued)

OTHER PUBLICATIONS

International Search Report dated Jul. 24, 2019, issued in PCT counterpart application (No. PCT/IL2019/050543).

(Continued)

*Primary Examiner* — Sara Addisu (74) *Attorney, Agent, or Firm* — Womble Bond Dickinson (US) LLP (57) ABSTRACT

An elongated tool holder includes a tool anti-vibration component having a component housing portion and an anti-vibration arrangement. The anti-vibration arrangement includes an enclosed interior component cavity formed in the component housing portion. The anti-vibration arrangement also includes a vibration absorber portion disposed within the component cavity that is integrally formed with the component housing portion to have unitary one-piece construction therewith. The vibration absorber portion includes a vibration absorbing mass and at least one elastic suspension member through which the vibration absorbing mass is connected to the component housing portion. The component cavity includes an oscillating space located between an inner surface of the component housing portion and the vibration absorber portion. The vibration absorbing mass is configured to oscillate within the oscillating space upon elastic deformation of the at least one suspension member. A cutting tool is provided with the tool holder.

37 Claims, 3 Drawing Sheets

(56) References Cited

U.S. PATENT DOCUMENTS

| | | | | |
|---|---|---|---|---|
| 2,656,742 | A * | 10/1953 | Poole | B23B 29/022 188/322.5 |
| 2,699,696 | A * | 1/1955 | Hahn | B23B 29/022 188/378 |
| 3,207,009 | A * | 9/1965 | Carlstedt | B23B 29/022 188/380 |
| 3,559,512 | A * | 2/1971 | Aggarwal | B23B 29/022 188/322.5 |
| 3,612,222 | A * | 10/1971 | Minor | E04B 1/985 188/268 |
| 3,642,378 | A * | 2/1972 | Hahn | B23B 29/022 408/143 |
| 3,662,855 | A * | 5/1972 | Adams | B25D 17/11 173/210 |
| 3,774,730 | A * | 11/1973 | Maddux | B23B 29/022 188/379 |
| 3,820,422 | A * | 6/1974 | Rivin et al. | B23B 29/022 408/143 |
| 3,838,936 | A * | 10/1974 | Andreassen | B23B 29/022 188/268 |
| 3,923,414 | A * | 12/1975 | Hopkins | B23B 29/022 408/143 |
| 4,553,884 | A * | 11/1985 | Fitzgerald | B23B 29/022 408/143 |
| 4,616,738 | A * | 10/1986 | Shurtliff | B23B 29/022 188/380 |
| 5,170,103 | A * | 12/1992 | Rouch | B23B 29/022 318/128 |
| 6,443,673 | B1 | 9/2002 | Etling et al. | |
| 6,925,915 | B1 * | 8/2005 | Claesson | B23B 25/02 82/133 |
| 7,234,379 | B2 | 6/2007 | Claesson et al. | |
| 8,371,776 | B2 * | 2/2013 | Lin | B23B 27/002 408/143 |
| 8,946,585 | B2 | 2/2015 | Kappmeyer | |
| 9,579,730 | B2 | 2/2017 | Frota De Souza Filho | |
| 2002/0036091 | A1 * | 3/2002 | Claesson | B23B 29/022 173/162.1 |
| 2002/0083805 | A1 * | 7/2002 | Lundblad | B23B 27/002 82/1.11 |
| 2007/0089574 | A1 * | 4/2007 | Murakami | B23B 27/002 82/158 |
| 2007/0180961 | A1 * | 8/2007 | Imai | B23B 29/125 82/1.5 |
| 2010/0096228 | A1 * | 4/2010 | Digemes | B23B 27/002 188/269 |
| 2010/0242696 | A1 * | 9/2010 | Digemes | B23B 27/10 83/169 |
| 2012/0099940 | A1 * | 4/2012 | de Souza Filho | B23B 31/02 409/131 |
| 2013/0004250 | A1 * | 1/2013 | Gamble | B23C 5/003 407/40 |
| 2016/0305503 | A1 | 10/2016 | Freyermuth et al. | |
| 2016/0377140 | A1 | 12/2016 | Frota De Souza Filho | |
| 2017/0173701 | A1 * | 6/2017 | Hecht | B23B 27/002 |
| 2017/0197258 | A1 | 7/2017 | Frota De Souza Filho et al. | |
| 2018/0036851 | A1 * | 2/2018 | Rattunde | B23B 5/167 |

FOREIGN PATENT DOCUMENTS

| | | |
|---|---|---|
| JP | 07164217 A * | 6/1995 |
| WO | WO 2012/084688 | 6/2012 |
| WO | WO 2012/084688 A1 | 6/2012 |

OTHER PUBLICATIONS

Written Opinion dated Jul. 24, 2019, issued in PCT counterpart application (No. PCT/IL2019/050543).

* cited by examiner

TOOL HOLDER HAVING INTEGRALLY FORMED ANTI-VIBRATION COMPONENT AND CUTTING TOOL PROVIDED WITH TOOL HOLDER

FIELD OF THE INVENTION

The subject matter of the present application relates to tool holders, in general, and to such tool holders having an anti-vibration component, in particular, and to such an anti-vibration component being manufactured by additive manufacturing further in particular.

BACKGROUND OF THE INVENTION

Tool holders can be provided with an anti-vibration arrangement for suppressing vibration of the tool holder during metal cutting operations. Typically, the anti-vibration arrangement is a spring-mass system that includes a cavity and a vibration absorbing mass suspended therein by elastic supporting members. The cavity can be filled with a viscous fluid.

In some such anti-vibration arrangement said elastic supporting members can be formed from o-ring type structures. Examples of such tool holding systems, are disclosed in, for example, U.S. Pat. No. 9,579,730, US 2016/305503, U.S. Pat. Nos. 7,234,379, 6,443,673 and 3,774,730.

By virtue of additive manufacturing, alternative anti-vibration arrangements can be used. For example, WO 2012/084688 discloses cavities that are filled with a flowable mixture of materials such as powder and gas or liquid and gas. A spatial structure is provided in said cavities as a three-dimensional flow obstacle. Another example, U.S. Pat. No. 8,946,585, discloses a cavity provided for dampening tool vibration that is at least partially filled with non-solidified (non-melted) powderous material.

It is an object of the subject matter of the present application to provide a new and improved anti-vibration arrangement.

SUMMARY OF THE INVENTION

In accordance with a first aspect of the subject matter of the present application there is provided a tool holder, elongated along a holder longitudinal axis thereof and having a tool anti-vibration component, the tool anti-vibration component comprising:
 a component housing portion; and
 an anti-vibration arrangement comprising:
  an interior component cavity formed in component housing portion and having inwardly facing cavity wall surface;
  a vibration absorber portion disposed within the component cavity and integrally formed with the component housing portion to have unitary one-piece construction therewith, the vibration absorber portion comprising:
   a vibration absorbing mass suspended within the component cavity; and
   at least one resilient suspension member connecting the vibration absorbing mass to the component housing portion; and
  an oscillating space located between the vibration absorber portion and the inwardly facing cavity wall surface, wherein:
   the vibration absorbing mass is configured to oscillate within the oscillating space upon elastic deformation of the at least one suspension member.

In accordance with a second aspect of the subject matter of the present application there is provided a cutting tool comprising:
 a tool holder of the type described above; and
 a cutting portion comprising at least one cutting insert.

In accordance with a third aspect of the subject matter of the present application there is provided a tool holder, elongated along a holder longitudinal axis thereof and having a tool anti-vibration component, the tool anti-vibration component comprising:
 a component housing portion; and
 an anti-vibration arrangement comprising:
  an interior component cavity formed in component housing portion and having inwardly facing cavity wall surface;
  a vibration absorber portion disposed within the component cavity and integrally formed with the component housing portion to have unitary one-piece construction therewith, the vibration absorber portion comprising:
   a vibration absorbing mass suspended within the component cavity; and
   at least one resilient suspension member connecting the vibration absorbing mass to the component housing portion; and
  an oscillating space located between the vibration absorber portion and the inwardly facing cavity wall surface, wherein:
   the oscillating space is filled with a viscous fluid; and
   the vibration absorbing mass is connected to the component housing portion only at the at least one suspension member.

It is understood that the above-said is a summary, and that features described hereinafter may be applicable in any combination to the subject matter of the present application, for example, any of the following features may be applicable to the tool holder or the cutting tool:

The elastic deformation can be caused by a tensile load applied by the vibration absorbing mass on the at least one suspension member.

The component housing portion can comprise a first additively manufactured metallic material. The vibration absorbing mass can comprise a second additively manufactured metallic material. The first and second additively manufactured metallic materials can be different from one another.

The vibration absorber portion can comprise only a single resilient suspension member connecting the vibration absorbing mass to the component housing portion, such that the vibration absorbing mass is cantilevered within the component cavity.

The oscillating space can entirely circumferentially surround the vibration absorber portion.

The oscillating space can be filled with a viscous fluid.

The vibration absorbing mass can be connected to the component housing portion only at the at least one suspension member.

The at least one suspension member may not be pre-loaded.

The at least one suspension member can be pre-loaded.

The anti-vibration arrangement can comprise a tuning member that protrudes into the oscillating space and that abuts one of the at least one suspension members so that the suspension member is pre-loaded.

The at least one suspension member can be elongated in the same direction as the tool holder.

The at least one suspension member can comprise a suspension member peripheral surface extending about a suspension member longitudinal axis. The suspension member peripheral surface can have a cylindrical shape.

The component cavity and the vibration absorbing mass can be elongated in the same direction as the at least one suspension member.

The at least one suspension member can be connected to a mass longitudinal end of the vibration absorbing mass.

The vibration absorber portion can comprise two suspension members connected to two opposite mass longitudinal ends of the vibration absorbing mass.

The vibration absorbing mass and the at least one suspension member can be co-axial with the tool holder.

The vibration absorbing mass can have a mass length measured in its lengthwise direction. The at least one suspension member can have a suspension member length measured in its lengthwise direction. The mass length can be at least five times greater than the suspension member length.

The vibration absorbing mass can have a mass maximum cross-sectional dimension. The at least one suspension member can have a suspension member maximum cross-sectional dimension. The mass maximum cross-sectional dimension can be at least five times greater than the suspension member maximum cross-sectional dimension.

The vibration absorbing mass can have a mass length extending along a mass longitudinal axis, and can comprise two opposite mass end surfaces (56) and a mass peripheral surface extending therebetween, the mass peripheral surface (58) extending about the mass longitudinal axis.

The vibration absorbing mass can have a mass transverse cross-section taken in a plane perpendicular to the mass longitudinal axis, which can be uniform for at least 60% of the mass length.

The mass peripheral surface can have a cylindrical shape except at the mass end surfaces. The vibration absorbing mass can have a mass transverse cross-section taken in a plane perpendicular to the mass longitudinal axis that is non-uniform therealong.

The mass peripheral surface can taper inwardly towards the mass longitudinal axis.

The mass end surfaces can be planar and oriented perpendicular to the mass longitudinal axis.

The mass end surfaces can taper inwardly towards the mass longitudinal axis in a direction away from the mass peripheral surface.

The component cavity can have a shape that matches a shape of the vibration absorbing mass.

The tool anti-vibration component can be elongated, along a component longitudinal axis thereof, and in same direction as the tool holder.

The tool anti-vibration component can further comprise two opposite component end surfaces and a component peripheral surface extending therebetween, the component peripheral surface extending about the component longitudinal axis and at least one component through hole extending between, and opening out to, the cavity wall surface and one of the component end surfaces and the component peripheral surface. The component cavity can be sealed by at least one sealing member located in the at least one component through hole.

The tool anti-vibration component can comprise exactly two component through holes.

The at least one component through hole can extend between, and opens out to, the cavity wall surface and one of the component end surfaces.

The cutting portion can be releasably attached to the tool holder.

The anti-vibration arrangement can be disposed at a forward end of the cutting tool.

The cutting tool can be non-rotary,

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
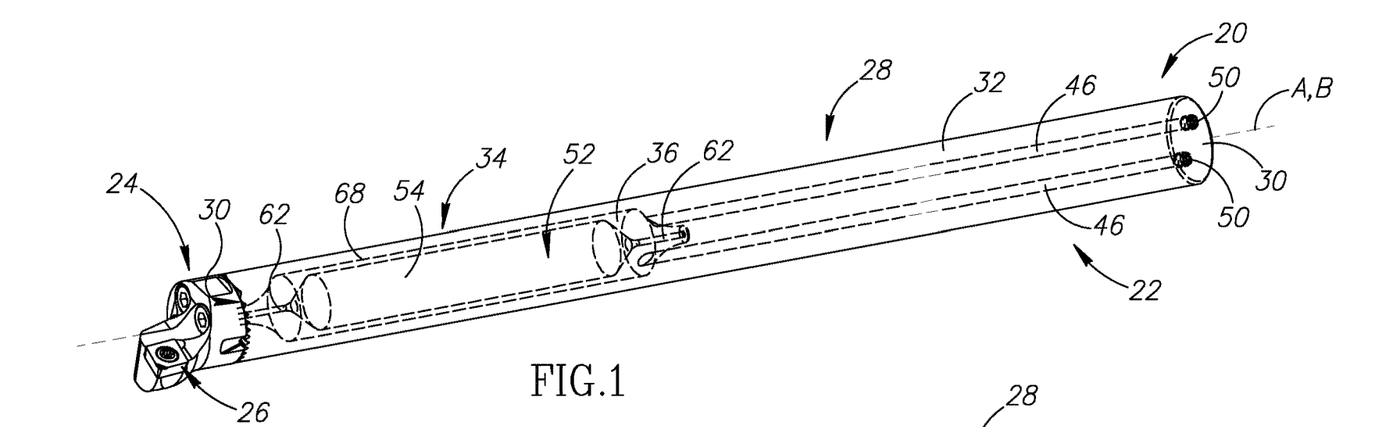
FIG. 1 is a perspective view of a cutting tool in accordance with a first embodiment of the present application, showing an anti-vibration component.

Attention is first drawn to FIG. 1 showing a cutting tool 20, for chip removal, depicting an aspect of the present application. The cutting tool 20 has a tool longitudinal axis A. In accordance with some embodiments of the subject matter of the present application, the cutting tool 20 can be a non-rotary cutting tool. That is to say, the cutting tool 20 is fixed and not designed to rotate about a rotational axis. In this non-limiting example shown in the drawings, the cutting tool 20 is a boring bar. However, the subject matter of the present application is not restricted only to boring bars and could also be applicable to, for example but not limited to, a grooving blade. The subject matter of the present application may also be applicable to rotary cutting tools, such as milling and drilling tools. For such rotary cutting tools, the cutting tool 20 is rotatable in a direction of rotation about the tool longitudinal axis A.

The cutting tool 20 includes a tool holder 22. The cutting tool 20 also includes a cutting portion 24 that includes at least one cutting insert 26. The at least one cutting insert 26 is designed to perform metal cutting operations and has a cutting edge for that purpose. In accordance with some embodiments of the subject matter of the present application, the at least one cutting insert 26 can be releasably attached to the tool cutting portion 24. The cutting portion 24 can be integrally formed with the tool holder 22. Alternatively, the cutting portion 24 can be releasably attached to the tool holder 22. The cutting portion 24 can be disposed at a forward end of the tool holder 22.

Figure 2:
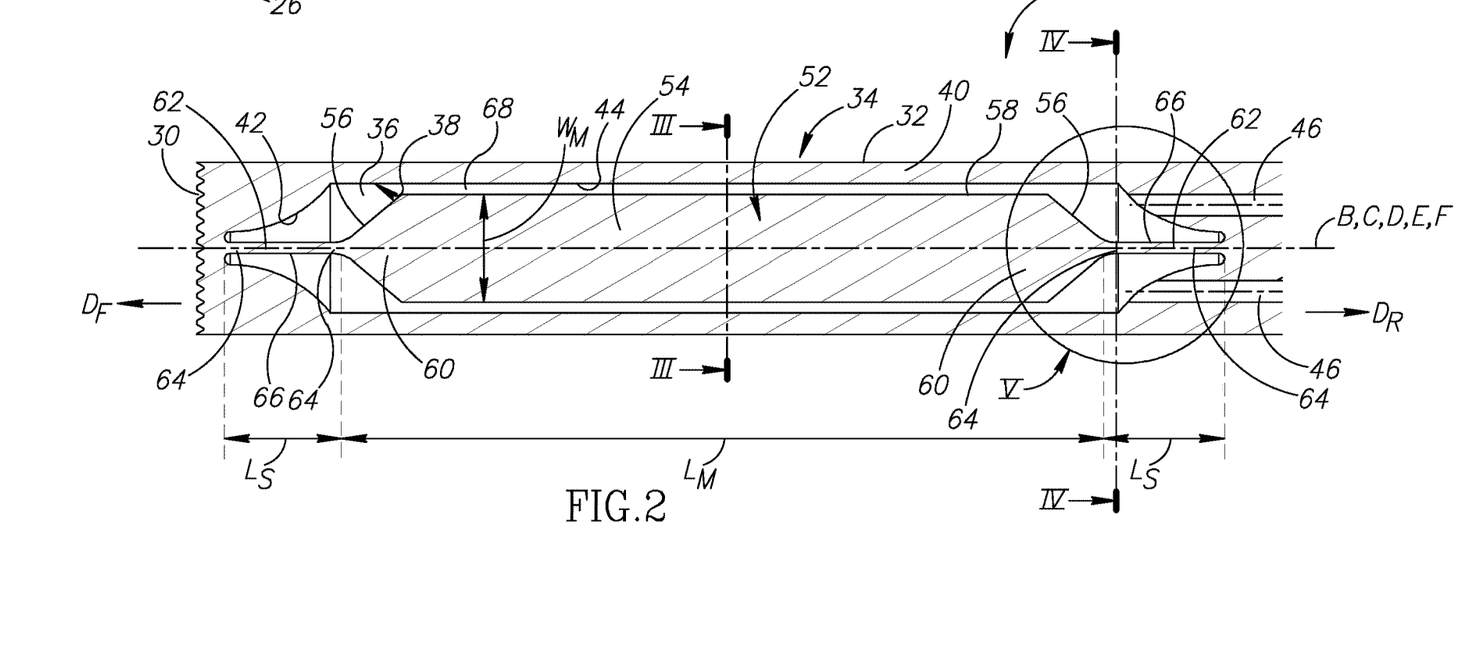
FIG. 2 is a partial longitudinal cross-sectional view of the tool anti-vibration component in FIG. 1, showing an anti-vibration arrangement.

Reference is now made to FIG. 2, showing the tool holder 22, depicting another aspect of the present application. The tool holder 22 has a tool holder longitudinal axis B, that defines opposite forward and rear directions $D_F$, $D_R$. In accordance with some embodiments of the subject matter of the present application, the cutting tool 20 and the tool holder 22 can be co-axial with each other. It should be noted that two elements (e.g. the cutting tool 20 and the tool holder 22 in the present case) are co-axial with each other when their longitudinal axes are co-incident (aligned with other).

It should further be noted that use of the terms "forward" and "rearward" throughout the description and claims refer to a relative position in a direction of the tool holder longitudinal axis B towards the left and right, respectively, in FIG. 2. Generally speaking, the forward direction is the direction towards the cutting portion 26.

Referring again to FIG. 2, the tool holder 22 includes a tool anti-vibration component 28. The tool anti-vibration component 28 is additively manufactured. The tool anti-vibration component 28 is integrally formed to have unitary one-piece construction. As used herein, an item is said to have "unitary one-piece construction" if it results from an additive manufacturing process, even if more than one material is used during the additive manufacture of that item. In accordance with some embodiments of the subject matter of the present application, the tool anti-vibration component 28 can include a first metallic material. For example, the first additively manufactured metallic material can be steel or cemented carbide. The tool anti-vibration component 28 can include an additional second additively manufactured metallic material. The first and second additively manufactured metallic materials can be different. For example, the second additively manufactured metallic material can be tungsten.

It should be noted that use of the term "additively manufactured" throughout the description and claims refers to refers to processes used to create a three-dimensional object in which layers of material are formed to create an object. Examples of such processes include, but are not limited to, Selective Laser Melting (SLM), Selective Laser Sintering (SLS), Direct Metal Laser Sintering (DMLS), Fused Deposition Modeling (FDM) and 3D Printing.

Reverting to FIG. 1, in accordance with some embodiments of the subject matter of the present application, the tool anti-vibration component 28 can be elongated along a component longitudinal axis C thereof. The tool anti-vibration component 28 can be elongated in same direction as the tool holder 22. In particular, the tool anti-vibration component 28 can be co-axial with the tool holder 22. The tool anti-vibration component 28 can include two opposite component end surfaces 30 and a component peripheral surface 32 that extends therebetween. The component peripheral surface 32 can extend about the component longitudinal axis C.

The tool holder 22 includes an anti-vibration arrangement 34 formed at the tool anti-vibration component 28. The tool anti-vibration arrangement 34 is designed to reduce or eliminate vibration of the cutting tool 20 when the cutting tool 20 performs a metal cutting operation. In accordance with some embodiments of the subject matter of the present application, the anti-vibration arrangement 34 and/or the tool anti-vibration component 28 can be disposed at a forward end of the cutting tool 20.

The tool anti-vibration component 28 includes a component housing portion 40 and an anti-vibration arrangement 34. The anti-vibration arrangement 34 includes an interior component cavity 36 that is formed in the component housing portion 40. That is to say, the interior component cavity 36 is enclosed within the component housing portion 40. The component cavity 36 is formed by an inwardly facing cavity wall surface 38. The cavity wall surface 38 delimits the component cavity 36 from the component housing portion 40. The component housing portion 40 surrounds the component cavity 36. In accordance with some embodiments of the subject matter of the present application, the component cavity 36 can be elongated along a cavity longitudinal axis D thereof. The component cavity 36 can be elongated in the same direction as the tool holder 22. In particular, the component cavity 36 can be co-axial with the tool holder 22. The cavity wall surface 38 can include two opposite cavity wall end surfaces 42 and a cavity wall peripheral surface 44 that extends therebetween. The cavity wall peripheral surface 44 can extend about the cavity longitudinal axis D.

Figure 3:
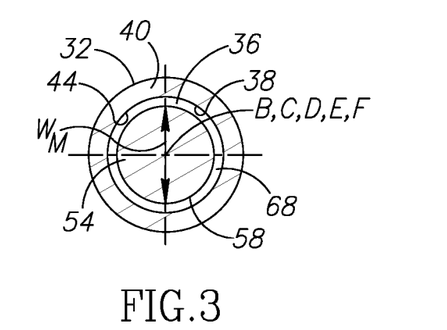
FIG. 3 is a first radial cross-sectional view of the tool anti-vibration component taken along line in FIG. 2.
Figure 6:
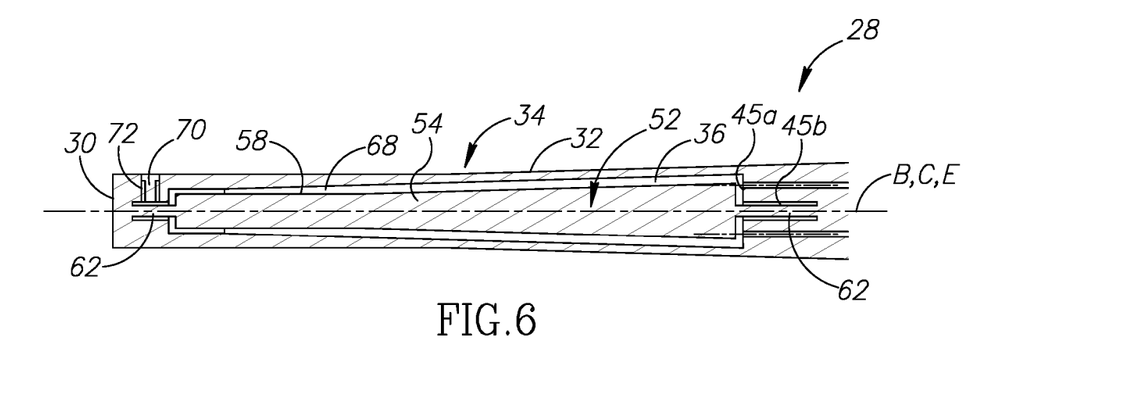
FIG. 6 is a schematic view of a partial longitudinal cross-section of the tool anti-vibration component, in accordance with a second embodiment of the present application.
Figure 7:
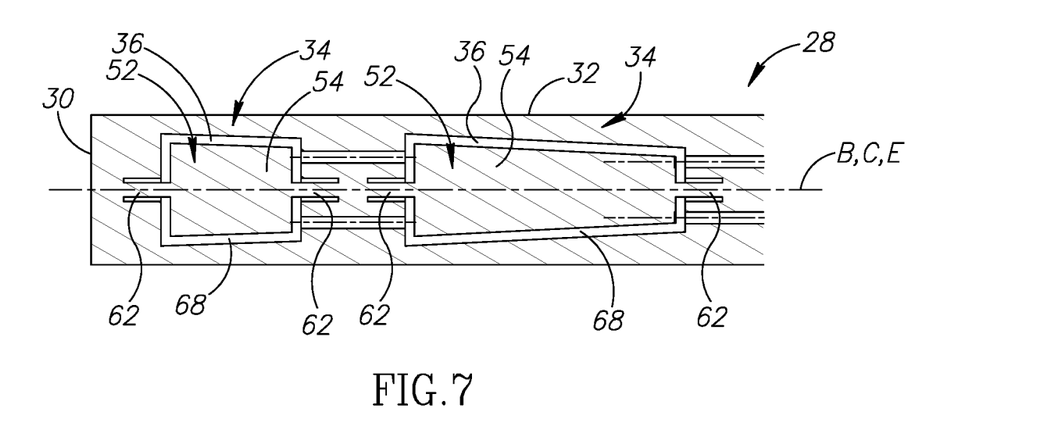
FIG. 7 is a schematic view of a partial longitudinal cross-section of the tool anti-vibration component, in accordance with a third embodiment of the present application.
Figure 8:
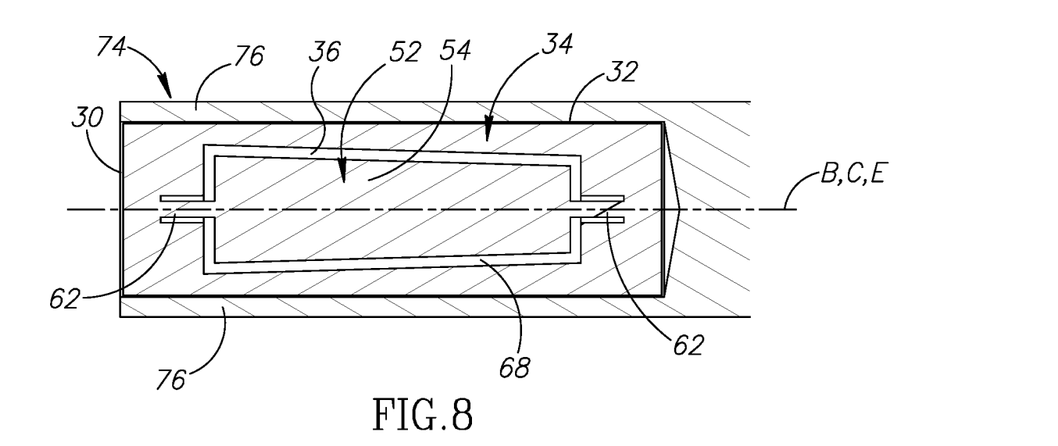
FIG. 8 is a schematic view of a partial longitudinal cross-section of the tool anti-vibration component, in accordance with a fourth embodiment of the present application.

Referring in addition to FIG. 3, showing a first radial cross-sectional view of the component cavity 36 (taken in a plane perpendicular to the cavity longitudinal axis D) through the cavity wall peripheral surface 44, the component cavity 36 has a cavity transverse cross-section. In accordance with some embodiments of the subject matter of the present application, said cavity transverse cross-section can be uniform along the cavity longitudinal axis D. The cavity wall peripheral surface 44 can have a cylindrical shape. As shown in FIGS. 6-8, in accordance with some other embodiments of the subject matter of the present application, the cavity transverse cross-section can be non-uniform along the cavity longitudinal axis D. The cavity wall peripheral surface 44 can taper inwardly towards the cavity longitudinal axis D in either direction therealong. For example, the cavity wall peripheral surface 44 can have a conical shape.

Figure 5:
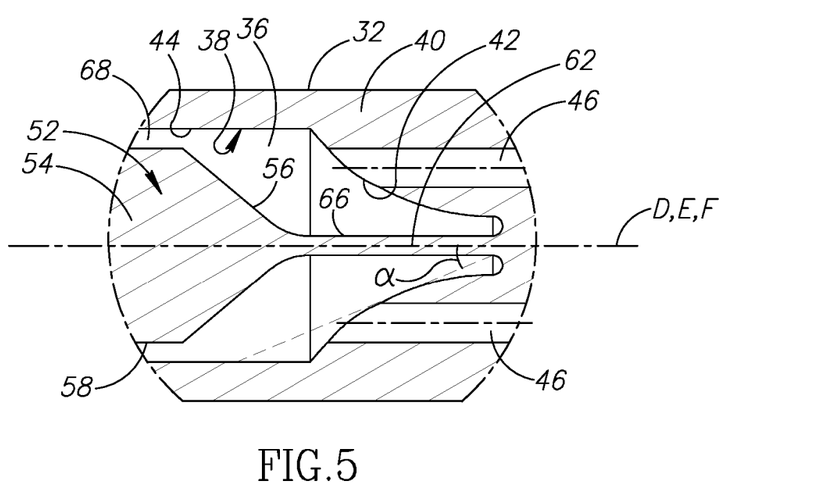
FIG. 5 is a detail of FIG. 2, indicated by reference numeral V.

Reverting to FIG. 5, in accordance with some embodiments of the subject matter of the present application, the cavity wall end surfaces 42 can taper inwardly towards the cavity longitudinal axis D in a direction away from the cavity wall peripheral surface 44. For example, the cavity wall end surfaces 42 can have a conical shape defined by a cavity cone angle α with respect to the cavity longitudinal axis D. The cone angle α can decrease towards the apex.

Referring to FIGS. 6-8, in accordance with some other embodiments of the subject matter of the present application, the cavity wall end surfaces 42 can be stepped, having two distinct portions, a first cavity wall end surface 45a, adjacent the cavity wall peripheral surface 44, that can be planar and oriented perpendicular to the cavity longitudinal axis D and a second cavity wall end surface 45b, distal the cavity wall peripheral surface 44, that can have a cylindrical shape.

As shown in FIGS. 1 and 2, in accordance with some embodiments of the subject matter of the present application, the tool anti-vibration component 28 can include at least one component through hole 46 that extends between, and opens out to, the cavity wall surface 38 and one of the component end surfaces 30 and the component peripheral surface 32. The at least one component through hole 46 allows the component cavity 36 to be filled with a viscous fluid as described later in the description. In some embodiments, the at least one component through hole 46 extends between, and opens out to, the cavity wall surface 38 and one of the component end surfaces 30. In some embodiments, the tool anti-vibration component 28 can include exactly two component through holes 46. Advantageously, this permits remnants of the additive manufacturing process, such as powder and particles etc., to be ejected from one of the component through holes 46 while the viscous fluid is injected into the component cavity 36 via another component through hole 46. Once the component cavity 36 is filled with the viscous fluid, the component cavity 36 can be sealed by at least one sealing member 50 located in the at least one component through hole 46. The at least one sealing member 50 may not extend beyond the cavity wall surface 38 into the component cavity 36. The component through hole 46 can be threaded and the at least one sealing member 50 can be a threaded sealing screw threadingly engaged in the component through hole 46.

Referring to FIG. 2, the anti-vibration arrangement 34 also includes a vibration absorber portion 52 that is disposed within the component cavity 36. The vibration absorber portion 52 includes a vibration absorbing mass 54. In accordance with some embodiments of the subject matter of the present application, the vibration absorbing mass 54 can be rigid. In some embodiments, while the component housing 40 is formed from a first additive metallic material such as steel, the vibration absorbing mass 54 may be formed form a denser second additive metallic material, such as tungsten. Even so, as discussed above the vibration absorbing mass 54 and the component housing 40 are still considered to be integrally formed to have unitary one-piece construction, by virtue of the additive manufacturing process.

The vibration absorbing mass 54 can be elongated along a mass longitudinal axis E thereof. The vibration absorbing mass 54 can be elongated in the same direction as the tool holder 22. In particular, the vibration absorbing mass 54 can be co-axial with the tool holder 22. The vibration absorbing mass 54 can include two opposite mass longitudinal ends 60 that are spaced apart along the mass longitudinal axis E. The vibration absorbing mass 54 can include two opposite mass end surfaces 56 and a mass peripheral surface 58 that extends therebetween. The mass peripheral surface 58 can extend about the mass longitudinal axis E. The two mass end surfaces 56 can be located at the two mass longitudinal ends 60, respectively. Referring to FIG. 2, the vibration absorbing mass 54 can have a mass length $L_M$ measured in its lengthwise direction (i.e. in the direction of the mass longitudinal axis E). Referring to FIG. 3, the vibration absorbing mass 54 can have a mass maximum cross-sectional dimension $W_M$ measured in a direction perpendicular to the mass longitudinal axis E). The mass maximum cross-sectional dimension $W_M$ may be considered a mass width $W_M$.

Referring in addition to FIG. 3, showing the first radial cross-sectional view of the vibration absorbing mass 54 (taken in a plane perpendicular to the mass longitudinal axis E) through the mass peripheral surface 58, the vibration absorbing mass 54 has a mass transverse cross-section. In accordance with some embodiments of the subject matter of the present application, the mass transverse cross-section can be uniform for at least 60% of the mass length $L_M$ along the mass longitudinal axis E. The mass peripheral surface 58 can have a cylindrical shape except at the mass end surfaces 56.

In accordance with some other embodiments of the subject matter of the present application, the mass transverse cross-section can be non-uniform along the mass longitudinal axis E. For example, as seen in FIG. 6, the mass peripheral surface 58 can taper inwardly towards the mass longitudinal axis E in either direction therealong. For example, the mass peripheral surface 58 can have a conical shape. The vibration absorbing mass 54 can be rotationally symmetrical about the mass longitudinal axis E.

In accordance with some embodiments of the subject matter of the present application, the mass end surfaces 56 can be planar and oriented perpendicular to the mass longitudinal axis E. In accordance with some other embodiments of the subject matter of the present application, the mass end surfaces 56 can taper inwardly towards the mass longitudinal axis E in a direction away from the mass peripheral surface 58. For example, the mass end surfaces 56 can have a conical shape.

In accordance with some embodiments of the subject matter of the present application, the cavity wall peripheral surface 44 can have a shape that matches the shape of the mass peripheral surface 58. One or both of the two cavity wall end surfaces 42 can have a shape that matches the shape of the corresponding mass end surface 56. The component cavity 36 can have a shape that matches the shape of the vibration absorber portion 52.

The vibration absorber portion 52 includes at least one resilient suspension member 62. The suspension member 62 is elastically deformable. In accordance with some embodiments of the subject matter of the present application, the at least one suspension member 62 may not be pre-loaded (that is, either compressed or stretched). The at least one suspension member 62 can be elongated along a suspension member longitudinal axis F. The at least one suspension member 62 can be elongated in the same direction as the tool holder 22. In particular, the at least one suspension member 62 can be co-axial with the tool holder 22. The at least one suspension member 62 can be include two opposite suspension member longitudinal ends 64 that are spaced apart along the suspension member longitudinal axis F. The at least one suspension member 62 can include a suspension member peripheral surface 66 that extends about the suspension member longitudinal axis F.

Figure 4:
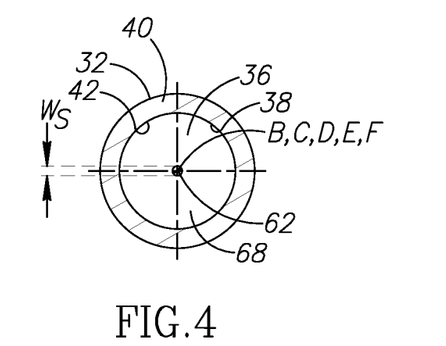
FIG. 4 is a second radial cross-sectional view of the tool anti-vibration component taken along line IV-IV in FIG. 2.

Referring in addition to FIG. 4, showing a second radial cross-sectional view of one suspension member 62 (taken in a plane perpendicular to the suspension member longitudinal axis F) through the suspension member peripheral surface 66, the one suspension member 62 has a suspension member transverse cross-section. The suspension member peripheral surface 66 can have a cylindrical shape. Referring to FIG. 2, the at least one suspension member 62 can have a suspension member length $L_S$ measured in its lengthwise direction (i.e. in the direction of the suspension member longitudinal axis F). Referring to FIG. 4, the at least one suspension member 62 can have a suspension member maximum cross-sectional dimension $W_S$ measured in a direction perpendicular to the suspension member longitudinal axis F). The suspension member maximum cross-sectional dimension $W_S$ can be considered a suspension member width $W_S$.

The vibration absorber portion 52 is integrally formed with the component housing portion 40 to have unitary one-piece construction therewith. The vibration absorbing mass 54 is connected to the component housing portion 40 at the at least one suspension member 62. Thus, the vibration absorbing mass 54 is suspended in the component cavity 36 by the at least one suspension member 62.

In accordance with some embodiments of the subject matter of the present application, the at least one suspension member 62 can be connected to one of the mass longitudinal ends 60. The vibration absorber portion 52 can include two suspension members 62 connected to the two mass longitudinal ends 60. The vibration absorber portion 52 can include exactly two suspension members 62. The suspension member peripheral surface 66 of each suspension member 62 can extend from a respective mass end surface 56 to a respective cavity wall end surface 42.

In accordance with some embodiments of the subject matter of the present application, the vibration absorbing mass 54 can be longer than the at least one suspension member 62. For example, the mass length $L_M$ can be at least five times greater than the suspension member length $L_S$. The vibration absorbing mass 54 can be wider than the at least one suspension member 62. For example, the mass maximum cross-sectional dimension $W_M$ can be at least five times greater than the suspension member maximum cross-sectional dimension $W_S$.

The anti-vibration arrangement 34 includes an oscillating space 68 formed in the component cavity 36. The oscillating space 68 is located between the vibration absorber portion 52 and the component housing portion 40 (and more particularly between the vibration absorber portion 52 and the inwardly facing cavity wall surface 38). Stated differently, the component housing portion 40 and the vibration absorber portion 52 are spaced apart by the oscillating space 68. In accordance with some embodiments of the subject matter of the present application, the oscillating space 68 entirely circumferentially surrounds the vibration absorber portion 52. That is to say, the oscillating space 68 can extend about the full (360°) angular extent of the cavity longitudinal axis D. The oscillating space 68 can form an internal annular slit at the vibration absorbing mass 54.

In accordance with some embodiments of the subject matter of the present application, the vibration absorbing mass 54 is connected to the component housing portion 40 only at the at least one suspension member 62. Thus, the oscillating space 68 is devoid of any separate additional solid element, such as an o-ring, disposed between and abutting the cavity wall surface 38 and the mass end surfaces 56 and/or the Mass Peripheral Surface 58 (as shown in, for example, U.S. Pat. No. 7,234,379).

The vibration absorbing mass 54 is configured to oscillate within the oscillating space 68 upon elastic deformation of the at least one suspension member 62. Stated differently, the vibration absorbing mass 54 is oscillatingly displaceable within the oscillating space 68 when the at least one suspension member 62 undergoes elastic deformation. In accordance with some embodiments of the subject matter of the present application, the elastic deformation can be caused by a tensile load applied by the vibration absorbing mass 54 on the at least one suspension member 62.

In the embodiment seen in FIG. 2, two suspension members 62 are used to connect the vibration absorbing mass 54 to the component housing portion 40—one suspension member 54 at each of the two opposite ends of the vibration absorbing mass 54. In some embodiments, however, only a single suspension member 62 may be used to connect the vibration absorbing mass 54 to the component housing portion 40. In such case, the vibration absorbing mass 54 is cantilevered within the component cavity 36.

When the cutting tool 20 encounters a workpiece, it is susceptible to vibration. Typically, for turning or milling cutting operations the vibrations are lateral vibrations. Typically, for drilling cutting operations, the vibrations are torsional vibrations. The vibration absorbing mass 54 oscillates at a vibration frequency. The anti-vibration arrangement is 34 designed to provide the vibration absorbing mass 54 with a vibration frequency close or identical to the natural frequency of the cutting tool 20, thereby reducing or eliminating vibration of the cutting tool 20.

Advantageously, the anti-vibration arrangement 34 can be tunable (so that the vibration frequency of the vibration absorbing mass 54 matches the natural frequency of the cutting tool 20) without the need to disassemble any separable parts. One or more mechanisms, alone or in combination, can be used to alter the vibration frequency at which the vibration absorbing mass 54 oscillates. In one non-limiting example, the at least one suspension member 62 can be pre-loaded. For example, referring to FIG. 6, the anti-vibration arrangement 34 can include a tuning member 70 that protrudes into the oscillating space 68. The tuning member 70 can abut one of the at least one suspension members 62, thereby adjusting the elastic properties of the at least one suspension member 62. In particular, the tool anti-vibration component 28 can include a threaded tuning through hole 72 that extends between, and opens out to, the cavity wall surface 38 and the component peripheral surface 32. The tuning member 70 can be a threaded adjustment screw threadingly engaged in the tuning through hole 72.

The oscillating space 68 can be filled with the viscous fluid, so that the viscous fluid circumferentially surrounds the vibration absorbing mass 54 and causes a damping effect on the vibration absorbing mass 54. Various viscous fluids having different viscosities can be used in order to adjust the damping effect.

The vibration absorbing mass 54 can be manufactured from the second additively manufactured metallic material while the component housing portion 40 can be manufactured from the first additively manufactured metallic material. In such a configuration, the weight of the vibration absorbing mass 54 can be adjusted without changing its dimensions.

It should be further be noted that another feature of the subject matter of the present application is that the anti-vibration arrangement 34 is suitable for neutralizing lateral vibrations and torsional vibrations.

Although the subject matter of the present application has been described to a certain degree of particularity, it should be understood that various alterations and modifications could be made without departing from the spirit or scope of the invention as hereinafter claimed.

Referring to FIG. 7, for example, the tool anti-vibration component 28 can include an additional second anti-vibration arrangement 34. The tool holder 22 can include an additional second tool anti-vibration component 28 (not shown). Thus, the tool holder 22 can include two anti-vibration arrangements 34. In such a configuration, the two oscillating spaces 68 can be in fluid communication with each other via the component through holes 46.

Referring to FIG. 8, the tool holder 22 can be modular. That is say, the tool holder 22 can include a shank component 74 separately manufactured from the tool anti-vibration component 28 and connected thereto to form the tool holder 22. In some embodiments, the tool anti-vibration component 28 may be inserted into a cavity formed in the shank component 74. The tool anti-vibration component 28 can be connected to the shank component 74 by, for example, brazing, welding, threading engagement, etc. Alternatively, the shank component 74 can include a shank sleeve portion 76 with the tool anti-vibration component 28 being connected therein via an interference fit. The shank component 74 can be additively manufactured. Alternatively, the shank component 74 can be manufactured by a conventional subtractive technology so that the tool holder 22 is so-called "hybrid".

Alternatively, as best seen in FIG. 1, the tool holder 22 can be non-modular, where the tool anti-vibration component 28 is integrally formed with the tool holder 22 in a unitary one-piece construction such that the tool anti-vibration component 28 is the tool holder's shank. Advantageously, in such a configuration the tool holder 22 needs no post-manufacturing assembly of separate parts.

What is claimed is:

1. A tool holder (22), elongated along a holder longitudinal axis (B) thereof and having a tool anti-vibration component (28), the tool anti-vibration component (28) comprising:
   a component housing portion (40); and
   an anti-vibration arrangement (34) comprising:
      an interior component cavity (36) formed in the component housing portion (40) and having inwardly facing cavity wall surface (38);
      a vibration absorber portion (52) disposed within the component cavity (36) and comprising:
         a vibration absorbing mass (54) suspended within the component cavity (36); and
         at least one resilient suspension member (62) connecting the vibration absorbing mass (54) to the component housing portion (40); and
      an oscillating space (68) located between the vibration absorber portion (52) and the inwardly facing cavity wall surface (38), wherein:
   the component housing portion (40), the vibration absorbing mass (54), and the at least one resilient suspension member (62) are integrally formed together to have unitary one-piece construction; and
   the vibration absorbing mass (54) is configured to oscillate within the oscillating space (68) upon elastic deformation of the at least one suspension member (62).

2. The tool holder (22), according to claim 1, wherein the elastic deformation is caused by a tensile load applied by the vibration absorbing mass (54) on the at least one suspension member (62).

3. The tool holder according to claim 1, wherein:
   the component housing portion (40) comprises a first metallic material;
   the vibration absorbing mass (54) comprises a second metallic material; and
   the first and second materials are different from one another.

4. The tool holder (22), according to claim 1, wherein the vibration absorber portion (52) comprises only a single resilient suspension member (62) connecting the vibration absorbing mass (54) to the component housing portion (40), such that the vibration absorbing mass (54) is cantilevered within the component cavity (36).

5. The tool holder (22), according to claim 1, wherein the oscillating space (68) entirely circumferentially surrounds the vibration absorber portion (52).

6. The tool holder (22), according to claim 1, wherein the oscillating space (68) is filled with a viscous fluid.

7. The tool holder (22), according to claim 1; wherein the vibration absorbing mass (54) is connected to the component housing portion (40) only at the at least one suspension member (62).

8. The tool holder (22), according to claim 1, wherein the at least one suspension member (62) is not pre-loaded.

9. The tool holder (22), according to claim 1, wherein the at least one suspension member (62) is pre-loaded.

10. The tool holder (22), according to claim 9, wherein the anti-vibration arrangement (34) comprises a tuning member (70) that protrudes into the oscillating space (68) and that abuts one of the at least one suspension members (62) so that the suspension member (62) is pre-loaded.

11. The tool holder (22), according to claim 1, wherein the at least one suspension member (62) is elongated in the same direction as the tool holder (22).

12. The tool holder (22), according to claim 11, wherein:
   the at least one suspension member (62) comprises a suspension member peripheral surface (66) extending about a suspension member longitudinal axis (F); and
   the suspension member peripheral surface (66) has a cylindrical shape.

13. The tool holder (22), according to claim 11, wherein the component cavity (36) and the vibration absorbing mass (54) are elongated in the same direction as the at least one suspension member (62).

14. The tool holder (22), according to claim 13, wherein the at least one suspension member (62) is connected to a mass longitudinal end (60) of the vibration absorbing mass (54).

15. The tool holder (22), according to claim 13, wherein the vibration absorber portion (52) comprises two suspension members (62) connected to two opposite mass longitudinal ends (60) of the vibration absorbing mass (54).

16. The tool holder (22), according to claim 11, wherein the component cavity (36), the vibration absorbing mass (54) and the at least one suspension member (62) are co-axial with the tool holder (22).

17. The tool holder (22), according to claim 11, wherein:
   the vibration absorbing mass (54) has a mass length ($L_M$) measured in its lengthwise direction;
   the at least one suspension member (62) has a suspension member length ($L_S$) measured in its lengthwise direction; and
   the mass length ($L_M$) is at least five times greater than the suspension member length ($L_S$).

18. The tool holder (22), according to claim 11, wherein:
   the vibration absorbing mass (54) has a mass maximum cross-sectional dimension ($W_M$),
   the at least one suspension member (62) has a suspension member maximum cross-sectional dimension ($W_S$); and
   the mass maximum cross-sectional dimension ($W_M$) is at least five times greater than the suspension member maximum cross-sectional dimension ($W_S$).

19. The tool holder (22), according to claim 1, wherein the vibration absorbing mass (54) has a mass length (Levi) extending along a mass longitudinal axis (E), and comprises two opposite mass end surfaces (56) and a mass peripheral surface (58) extending therebetween, the mass peripheral surface (58) extending about the mass longitudinal axis (E).

20. The tool holder (22), according to claim 19, wherein the vibration absorbing mass (54) has a mass transverse cross-section taken in a plane perpendicular to the mass longitudinal axis (E), which is uniform for at least 60% of the mass length ($L_M$).

21. The tool holder (22), according to claim 20, wherein the mass peripheral surface (58) has a cylindrical shape except at the mass end surfaces (56).

22. The tool holder (22), according to claim 19, wherein the vibration absorbing mass (54) has a mass transverse cross-section taken in a plane perpendicular to the mass longitudinal axis (E) that is non-uniform therealong.

23. The tool holder (22), according to claim 22, wherein the mass peripheral surface (58) tapers inwardly towards the mass longitudinal axis (E).

24. The tool holder (22), according to claim 19, wherein the mass end surfaces (56) are planar and oriented perpendicular to the mass longitudinal axis (E).

25. The tool holder (22), according to claim 19, wherein the mass end surfaces (56) taper inwardly towards the mass longitudinal axis (E) in a direction away from the mass peripheral surface (58).

26. The tool holder (22), according to claim 1, wherein the component cavity (36) has a shape that matches a shape of the vibration absorbing mass (54).

27. The tool holder (22), according to claim 1, wherein the tool anti-vibration component (28) is elongated, along a component longitudinal axis (C) thereof, and in same direction as the tool holder (22).

28. The tool holder (22), according to claim 27, wherein:
the tool anti-vibration component (28) further comprises:
two opposite component end surfaces (30) and a component peripheral surface (32) extending therebetween, the component peripheral surface (32) extending about the component longitudinal axis (C); and
at least one component through hole (46) extending between, and opening out to, the cavity wall surface (38) and one of the component end surfaces (30) and the component peripheral surface (32); wherein:
the component cavity (36) is sealed by at least one sealing member (50) located in the at least one component through hole (46).

29. The tool holder (22), according to claim 28, wherein the tool anti-vibration component (28) comprises exactly two component through holes (46).

30. The tool holder (22), according to claim 28, wherein the at least one component through hole (46) extends between, and opens out to, the cavity wall surface (38) and one of the component end surfaces (30).

31. A cutting tool (20) comprising:
a tool holder (22) in accordance with claim 1; and
a cutting portion (24) comprising at least one cutting insert (26).

32. The cutting tool (20), according to claim 31, wherein the cutting portion (24) is releasably attached to the tool holder (22).

33. The cutting tool (20), according to claim 31, wherein the anti-vibration arrangement (34) is disposed at a forward end of the cutting tool (20).

34. The cutting tool (20), according to claim 31, wherein the cutting tool (20) is non-rotary.

35. A tool holder (22), elongated along a holder longitudinal axis (B) thereof and having a tool anti-vibration component (28), the tool anti-vibration component (28) comprising:
a component housing portion (40); and
an anti-vibration arrangement (34) comprising:
an interior component cavity (36) formed in the component housing portion (40) and having inwardly facing cavity wall surface (38);
a vibration absorber portion (52) disposed within the component cavity (36) and comprising:
a vibration absorbing mass (54) suspended within the component cavity (36); and
at least one resilient suspension member (62) connecting the vibration absorbing mass (54) to the component housing portion (40); and
an oscillating space (68) located between the vibration absorber portion (52) and the inwardly facing cavity wall surface (38), wherein:
the component housing portion (40), the vibration absorbing mass (54) and the at least one resilient suspension member (62), are integrally formed together to have unitary one-piece construction; and
the oscillating space (68) is filled with a viscous fluid; and
the vibration absorbing mass (54) is connected to the component housing portion (40) only at the at least one suspension member (62).

36. The tool holder (22), according to claim 35, wherein:
the vibration absorbing mass (54) has a mass maximum cross-sectional dimension ($W_M$),
the at least one resilient suspension member (62) has a suspension member maximum cross-sectional dimension ($W_S$); and
the mass maximum cross-sectional dimension ($W_M$) is greater than the suspension member maximum cross-sectional dimension ($W_S$).

37. The tool holder (22), according to claim 1, wherein:
the vibration absorbing mass (54) has a mass maximum cross-sectional dimension ($W_M$);
the at least one resilient suspension member (62) has a suspension member maximum cross-sectional dimension ($W_S$); and
the mass maximum cross-sectional dimension ($W_M$) greater than the suspension member maximum cross-sectional dimension ($W_S$).

* * * * *